(12) United States Patent
Yuasa

(10) Patent No.: US 8,478,193 B2
(45) Date of Patent: Jul. 2, 2013

(54) DEVICE-IDENTIFYING SYSTEM, DEVICE-IDENTIFYING METHOD, CONTROLLING DEVICE, AND CONTROLLED DEVICE

(75) Inventor: Naoki Yuasa, Chiba (JP)

(73) Assignee: Sony Corporation (JP)

( * ) Notice: Subject to any disclaimer, the term of this patent is extended or adjusted under 35 U.S.C. 154(b) by 450 days.

(21) Appl. No.: 12/592,616

(22) Filed: Nov. 30, 2009

(65) Prior Publication Data

US 2010/0151893 A1 Jun. 17, 2010

(30) Foreign Application Priority Data

Dec. 15, 2008 (JP) ................ P2008-318576

(51) Int. Cl.
*H04B 7/15* (2006.01)
(52) U.S. Cl.
USPC ................... 455/11.1; 455/556.1
(58) Field of Classification Search
USPC ................... 455/7, 11.1, 13.1, 41.2
See application file for complete search history.

(56) References Cited

U.S. PATENT DOCUMENTS

2006/0015937 A1* 1/2006 Illowsky et al. ............ 726/18
2006/0085579 A1 4/2006 Sato

FOREIGN PATENT DOCUMENTS

| JP | 2006-115196 A | 4/2006 |
| JP | 2007088904 A | 4/2007 |
| JP | 2007259385 A | 10/2007 |

OTHER PUBLICATIONS

Office Action from Japanese Application No. 2008-318576, dated Nov. 20, 2012.

* cited by examiner

*Primary Examiner* — Tu X Nguyen
(74) *Attorney, Agent, or Firm* — Lerner, David, Littenberg, Krumholz & Mentlik, LLP

(57) ABSTRACT

There is provided an device-identifying system including: a controlling device capable of communicating with external devices via a network and using a wireless communication method to transmit an device-identifying signal, for identifying one of the external devices capable of communicating by the wireless communication method, to the one of the external devices without relying on the network; and a controlled device capable of communicating with the controlling device via the network, when the controlled device receives the device-identifying signal from the controlling device, the controlled device transmitting, to the network via multicast or broadcast, a response indicating that the controlled device has received the device-identifying signal, wherein when the controlling device receives the response, the controlling device determines that the controlled device having transmitted the response is the device having received the device-identifying signal transmitted from the controlling device.

13 Claims, 6 Drawing Sheets

FIG.1

DEVICE-IDENTIFYING SYSTEM: 100

101

130

140

120A

120B  ANOTHER ROOM

110A

110B

P

Q

R

DEVICE-IDENTIFYING SYSTEM, DEVICE-IDENTIFYING METHOD, CONTROLLING DEVICE, AND CONTROLLED DEVICE

CROSS-REFERENCE TO RELATED APPLICATION

The present application claims priority from Japanese Patent Application No. JP 2008-318576 filed in the Japanese Patent Office on Dec. 15, 2008, the entire content of which is incorporated herein by reference.

BACKGROUND OF THE INVENTION

1. Field of the Invention

The present invention relates to an device-identifying system, an device-identifying method, a controlling device, and a controlled device. More particularly, the present invention relates to a controlling device and a controlled device capable of communicating with each other via a network, and also relates to an device-identifying system and an device-identifying method in which an device can identify another device with which the device is communicating.

2. Description of the Related Art

A mechanism has been realized to allow devices connected to a network to communicate with each other, so that an device controls another device in communication via the network, obtains and displays the state of the device in communication, and receive contents distributed from a server on the network. Recently, in order to use this with devices of various manufacturers, a common mechanism called Digital Living Network Alliance (DLNA) is coming into use.

For example, when an device placed in front of a user is controlled via a network with this kind of mechanism, it is necessary to display a list of all of the devices connected to the network and allow a user to select a target device from the list. Therefore, when many devices are connected to the network, a user has to select a target device from the device list including many devices, which is a troublesome operation for the user.

Moreover, the device list includes all of the devices capable of communicating via the network regardless of the installed locations, and further, the names of the devices shown in the device list are irrelevant to the locations where the devices are installed. Therefore, the user has to previously register the name of each device in order to display the names which are easy for the user to understand during the selection operation of device.

In view of such circumstances, Japanese Patent Application Laid-Open No. 2006-115196 suggests a mechanism for causing a transmitting device to transmit an identification start signal in infrared light including address information of the transmitting device and causing a receiving device to receive the identification start signal and send a reply in response thereto via a network based on the address information, so that the transmitting device identifies the receiving device located in the direction in which the infrared light is transmitted, using the directivity of the infrared light.

SUMMARY OF THE INVENTION

However, in order for the receiving device to send a reply to a correct address, it is necessary for the transmitting device to transmit information capable of representing all of the addresses in the identification start signal. Therefore, there is a problem in that when communication means of a slow communication speed or communication means limited in the number of transmittable bits is used, the transmitting device transmits a portion of the address, and then, the replying device has to perform a processing to complete the remaining address information based on the address of the replying device itself. When the reply is sent over different segments, there is a problem in that it may be difficult to complete the remaining address.

In light of the foregoing, it is desirable to provide a novel and improved a controlling device and a controlled device capable of communicating with each other via a network, and also relates to an device-identifying system and an device-identifying method in which an device can identify another device with which the device is communicating, wherein even where communication means of a slow communication speed or communication means limited in the number of transmittable bits is used, an device placed in front of a user can be identified more easily than ever before.

According to an embodiment of the present invention, there is provided a device-identifying system including:

a controlling device capable of communicating with external devices via a network, the controlling device using a wireless communication method limited in at least one of a directivity and a transmittable communication range to transmit an device-identifying signal, for identifying one of the external devices capable of communicating by the wireless communication method, to the one of the external devices without relying on the network; and a controlled device capable of communicating with the controlling device via the network, when the controlled device receives the device-identifying signal from the controlling device, the controlled device transmitting, to the network via multicast or broadcast, a response indicating that the controlled device has received the device-identifying signal, wherein when the controlling device receives the response, the controlling device determines that the controlled device having transmitted the response has received the device-identifying signal transmitted from the controlling device.

With the device-identifying system according to the present invention, the response is transmitted via multicast or broadcast to all of the devices on the network which the controlled device transmitting the response belongs to, and therefore, it is not necessary to specify an address to which the response is to be transmitted. Further, it is not necessary for the controlling device to transmit address information of the controlling device, which don't have to transmit the response to the device-identifying signal, and therefore, the controlling device can reduce the amount of data to transmit the device-identifying signal.

The controlling device may transmit the device-identifying signal including an identifier for distinguishing the controlling device, the controlled device may transmit the response including the identifier received from the controlling device, and the controlling device may receive only the response including the same identifier as the identifier transmitted from the controlling device.

The controlling device may select and transmits one of a plurality of types of device-identifying signals, the controlled device may transmit the response including signal type information indicating the type of the one of the device-identifying signals, and the controlling device may receive only the response including the signal type information indicating the same type as the type of the one of the device-identifying signals transmitted from the controlling device.

The device-identifying signal may be made in a format compatible with a control signal for controlling the controlled device, the controlling device may select and transmits one of the device-identifying signals made in the format compatible with the control signal, the controlled device may transmit the response including signal type information indicating the one of the device-identifying signals, and the controlling device may receive only the response including the signal type information indicating the same type as the one of the device-identifying signals transmitted from the controlling device.

When a plurality of controlled devices receive the device-identifying signal, the controlling device may receive responses from all of the controlled devices that transmit the responses within a predetermined period of time.

When the controlling device receives the responses from the plurality of controlled devices, the controlling device may display, on a user interface screen, a list of the controlled devices that transmitted the responses.

The controlling device may determine that one of the controlled devices selected from the list of the controlled devices has received the device-identifying signal transmitted from the controlling device.

When the controlling device receives the responses from the plurality of controlled devices, the controlling device may determine that one of the plurality of controlled devices having transmitted the response received first has received the device-identifying signal transmitted from the controlling device.

The wireless communication method may be a communication method using an optical signal including infrared light.

According to another embodiment of the present invention, there is provided a device-identifying method, including the steps of:

causing a controlling device capable of communicating with external devices via a network to use a wireless communication method limited in at least one of a directivity and a transmittable communication range to transmit a predetermined device-identifying signal to one of the external devices capable of communicating by the wireless communication method without relying on the network;

causing a controlled device capable of communicating with the controlling device via the network to transmit, to the controlling device via the network via multicast or broadcast, a response indicating that the controlled device has received the device-identifying signal, when the controlled device receives the device-identifying signal from the controlling device; and causing the controlling device to determine that the controlled device having transmitted the response is the device capable of communicating by the wireless communication method, when the controlling device receives the response.

According to another embodiment of the present invention, there is provided a controlling device including:

a network communication unit for communicating with external devices via a network;

a wireless communication unit that uses a wireless communication method limited in at least one of a directivity and a transmittable communication range to communicate with at least some of the external devices;

an device-identifying signal generation unit for generating an device-identifying signal which is to be transmitted from the wireless communication unit in order to identify one of the external devices capable of communicating by the wireless communication method; and an device-identifying unit, when the network communication unit receives a response from the external device that received the device-identifying signal, the device-identifying unit determining that the external device having transmitted the response has received the device-identifying signal transmitted from the wireless communication unit.

According to another embodiment of the present invention, there is provided a controlled device including:

a wireless communication unit that uses a wireless communication method limited in at least one of a directivity and a transmittable communication range to communicate with an external device;

a response data generation unit, when the wireless communication unit receives from the external device an device-identifying signal for identifying an device capable of communicating by the wireless communication method, the response data generation unit generating response data indicating that the device-identifying signal has been received; and a network communication unit for transmitting the response data via the network via multicast or broadcast.

According to the embodiments of the present invention described above, even when communication means of a slow communication speed or communication means limited in the number of transmittable bits is used, an device located in front of a user can be identified more easily than ever before, in the controlling device and the controlled device capable of communicating with each other via the network, the device-identifying system and the device-identifying method in which an device can identify another device with which the device is communicating.

BRIEF DESCRIPTION OF THE DRAWINGS

FIG. 1 is an explanatory diagram showing overall configuration of an device-identifying system according to a first embodiment of the present invention;

DETAILED DESCRIPTION OF THE EMBODIMENTS

Figure 2:
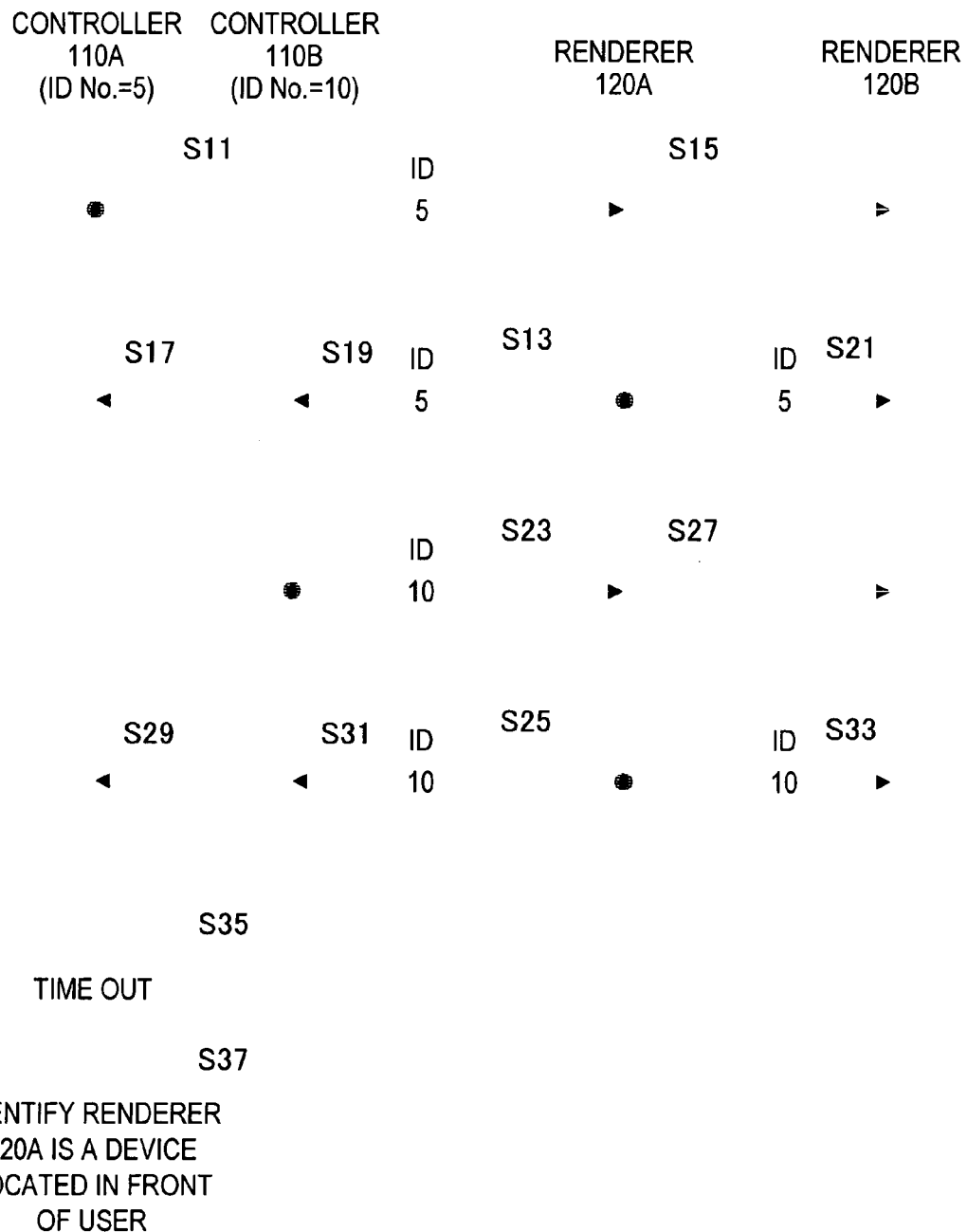
FIG. 2 is a sequence diagram schematically showing an device-identifying method of the device-identifying system according to the embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[First Embodiment]

Configuration of Device-Identifying System According to a First Embodiment of the Present Invention First, overall configuration of the device-identifying system according to the first embodiment of the present invention will be described with reference to FIG. 1. It should be noted that FIG. 1 is an explanatory diagram showing the overall configuration of the device-identifying system according to the present embodiment.

In the below explanation, a network using DLNA is explained as an example of a network, a digital media controller (DMC, hereinafter simply referred to as "controller")

in the DLNA is explained as an example of the controlling device according to the present embodiment, and a digital media renderer (DMR, hereinafter simply referred to as "renderer") in the DLNA is explained as an example of the controlled device according to the present embodiment. However, the network, the controlling device, and the controlled device according to the present embodiment are not necessarily limited to the network and electronic devices supporting the DLNA.

In other words, although the network according to the present embodiment is not especially limited, the network according to the present embodiment may be, for example, IEEE 802.3 (Ethernet (registered trademark)), Universal Serial Bus (USB), High-Definition Multimedia Interface (HDMI), IEEE 1394, IEEE 802.11 (wireless LAN), and Bluetooth (registered trademark).

The controlling device and the controlled device according to the present embodiment may be all kinds of devices capable of connecting to one of the networks listed above as examples, such as a television receiver, a recorder, an audio system, and a PC.

An device-identifying system 100 shown in FIG. 1 is a system for causing the renderer to play contents stored in a server on the network based on an instruction given by the controller, wherein the renderer placed in front of the controller can be identified. As shown in FIG. 1, the device-identifying system 100 includes, for example: two controllers 110A and 110B; a renderer 120A installed in the same room as the room in which the controllers 110A and 110B are installed; a renderer 120B installed in a room different from the room in which the controllers 110A and 110B are installed; and a server 130. These devices are connected to a router 140 to constitute a network 101.

The controllers 110A and 110B can control the renderers 120A and 120B in order to cause the renderers 120A and 120B to play the contents stored in the server 130 for a user. Specifically, the controllers 110A and 110B obtain a content list from the server 130, and display the obtained content list on a screen of a user interface of themselves. The controllers 110A and 110B transmit to the renderer 120A or the renderer 120B a control signal for instructing the renderer 120A or the renderer 120B to receive content distributed from the server 130, which is selected by user's operation from a displayed content list. The controllers 110A and 110B transmit to the renderer 120A or the renderer 120B a control signal for instructing the renderer 120A or the renderer 120B to play the content distributed by the server 130. Therefore, a user can watch and listen to, on the renderer 120A or the renderer 120B, the contents stored in the server 130 by using the controllers 110A and 110B.

Upon an instruction given by the controller 110A or the controller 110B, the renderers 120A and 120B receive the contents stored in and distributed by the server 130 on the network 101, and performs reproduction, recording, and the like of the contents. Specifically, upon receiving a control signal from the controllers 110A and 110B, the renderers 120A and 120B execute an instruction (for example, an instruction for distributing contents and an instruction for reproducing contents) based on the control signal.

In this embodiment, although the control signal is not especially limited, an optical signal including infrared light, an audio signal, and the like are used as the control signal, and the control signal is generated in a form of a combination of a category of a controlled device (the renderers 120A and 120B in the present embodiment) and a command. The category represents an device type of a controlled device (for example, "television 1" and "television 2", where the renderer 120A is the television 1 and the renderer 120B is the television 2). The command represents operation which an device of a specified category is instructed to perform (for example, "reproduction of contents", "acquisition of contents", and "recording of contents").

In the present embodiment, the server 130 has a function of DMS (Digital Media Server) in the DLNA. Specifically, the server 130 stores contents in a storage device of the server 130, and in reply to requests sent from other devices (the renderers 120A and 120B in the present embodiment) via the network 101, the server 130 can distribute contents to the other devices.

In the present embodiment, the router 140 has a function of wireless LAN access point (AP). The router 140 is connected via a wire to the renderers 120A and 120B and server 130, and is configured to be able to communicate with the controllers 110A and 110B via a wireless LAN.

In the device-identifying system 100 as described above, for example, the controller 110A can identify the renderer 120A placed in front of the controller 110A from among the renderer 120A, the renderer 120B, the server 130, and the controller 110B, which can be found to be present on the network 101. The mechanism by which the controller 110A identifies the renderer 120A will be hereinafter explained using an example where the renderer 120A plays the contents stored in the server 130 in accordance with an instruction given by the controller 110A in the device-identifying system 100.

First, as shown by an arrow P in FIG. 1, the controller 110A uses a wireless communication method not relying on the network 101 to transmit an device-identifying signal, for identifying an device placed in front of the controller 110A, to the renderer 120A that tries to play the contents stored in the server 130. The device-identifying signal is transmitted when, for example, a user uses the controller 110A to cause the renderer 120A to start playing the contents stored in the server 130.

The wireless communication method by which the device-identifying signal is transmitted is not especially limited as long as it does not rely on the network and is limited in at least one of the directivity and the transmittable communication range. For example, the wireless communication method may be an optical signal including infrared light, an audio signal, and the like. The device-identifying signal is generated in a form of a combination of the category and the command in a similar manner to the above-described control signal. However, the category of the device-identifying signal is information indicating the device-identifying signal which is different from other signals (for example, a control signal for operating a television receiver).

In the present embodiment, the device-identifying signal is assumed to be in the form of the combination of the category and the command, which is the same as that of the control signal, so as to be compatible with the control signal in terms of the format. But the device-identifying signal is not limited to this form in the present invention. Namely, the device-identifying signal may be generated in a format non-compatible with the control signal for controlling the renderer 120A (for example, a format including only a command without a category), and the controller 110A may select and transmit one of the device-identifying signals generated in a format non-compatible with the control signal. In this case, the renderer 120A transmits a response including signal type information representing one of the device-identifying signals. Further, the controller 110A may be configured to receive only the response including the signal type information representing the same type as that of the one of the device-identifying signals transmitted by the controller 110A.

As shown by an arrow Q in FIG. 1, the renderer 120B don't receive the device-identifying signal transmitted from the controller 110A by the wireless communication method limited in at least one of the directivity and the transmittable communication range because the renderer 120B is arranged in a room different from the room in which the controller 110A is arranged.

Next, the renderer 120A having received the device-identifying signal transmits a response indicating that the renderer 120A has received the device-identifying signal to the entire network 101 via multicast or broadcast as shown by an arrow R in FIG. 1. When the controller 110A receives this response, the controller 110A can determine that the renderer 120A having transmitted the response via the network 101 is located at a place where the renderer 120A can receive the device-identifying signal transmitted by the controller 110A. In other words, the controller 110A can determine that the renderer 120A is in front of the controller 110A.

Alternatively, when the controller 110A transmits the device-identifying signal to the renderer 120A, the controller 110A may transmit the device-identifying signal including an identifier for distinguishing the controller 110A. In this case, the renderer 120A may transmit a response including the identifier received from the controller 110A, and the controller 110A may be configured to receive only the response including the same identifier as the identifier transmitted by the controller 110A. Therefore, when there are a plurality of devices capable of transmitting the device-identifying signal (in the example in FIG. 1, the controllers 110A and 110B), the controller 110A can receive the response transmitted to the controller 110A without confusion with a response transmitted in reply to another device. As described above, the controller 110A transmits the device-identifying signal including an identifier and is configured to receive only the response including the identifier that the controller 110A has transmitted, so that the controller 110A can determine an device placed in front of the controller 110A even where there are a plurality of devices capable of transmitting the device-identifying signal.

The identifier is not especially limited, but for example, an ID specifying one of numerals from 1 to 255 may be used as the identifier. The ID may be a fixed value unique to each controlling device (the controllers 110A and 110B), or may be determined based on a random number and the like every time the device-identifying signal is transmitted.

Overview of Device-Identifying Method According to the First Embodiment of the Present Invention Next, the method by which the device-identifying system 100 identifies an device (the renderer 120A) placed in front of the controller 110A will be hereinafter explained more specifically with reference to FIG. 2. FIG. 2 is a sequence diagram schematically showing the device-identifying method of the device-identifying system 100 according to the present embodiment.

FIG. 2 shows an example where the controller 110A identifies an device, i.e., the renderer 120A, placed in front of the controller 110A when the controllers 110A and 110B and the renderers 120A and 120B included in the device-identifying system 100 shown in FIG. 1 are connected to the network 101. In the example of FIG. 2, the device-identifying signal including an identifier (ID) is transmitted, because there are two devices, i.e., the controllers 110A and 110B, capable of transmitting the device-identifying signal. In this example, the numeral of the ID of the controller 110A is 5, and the numeral of the ID of the controller 110B is 10.

In the present embodiment, as shown in FIG. 2, IDs are used in order to distinguish between the response to the device-identifying signal transmitted from another device and the response to the device-identifying signal transmitted from itself when there are a plurality of devices (for example, controllers) capable of transmitting the device-identifying signal. The device-identifying method using the IDs will be hereinafter explained.

First, when the controller 110A transmits the device-identifying signal, the controller 110A transmits the device-identifying signal including the ID for distinguishing the controlling device transmitting the device-identifying signal (in this case, the controller 110A) (S11). It should be noted that in the example of FIG. 2, the value of the ID for distinguishing the controller 110A is "5" as described above.

Next, when the renderer 120A receives the device-identifying signal transmitted from the controller 110A, the renderer 120A transmits a response including the ID ("5"), which has been received together with the device-identifying signal, to the network 101 via multicast or broadcast (S13). At this moment, the device-identifying signal transmitted from the controller 110A does not reach the renderer 120B and therefore don't be received by the renderer 120B, because the renderer 120B is installed in a room different from the room in which the controller 110A is installed (S15). Therefore, the renderer 120B does not transmit a response to the device-identifying signal transmitted from the controller 110A.

Next, when the response transmitted by the renderer 120A reaches the controller 110A via the network 101, the controller 110A compares the ID included in the response and the ID included in the device-identifying signal that the controller 110A transmitted. When the ID included in the response is determined to correspond to (be the same value as) the ID included in the device-identifying signal that the controller 110A transmitted, the controller 110A determines that the response is in reply to the device-identifying signal of the controller 110A itself, and receives the response. When the ID included in the response is determined not to correspond to (be a value different from) the ID included in the device-identifying signal that the controller 110A transmitted, the controller 110A determines that the response is in reply to an device-identifying signal transmitted by another device, and disregards the response. In the example of FIG. 2, the ID ("5") included in the response from the renderer 120A is the same value as the ID ("5") included in the device-identifying signal that the controller 110A transmitted, and therefore, the controller 110A determines that the response is in reply to the controller 110A, and receives the response (S17).

It should be noted that the response transmitted from the renderer 120A is transmitted via multicast or broadcast, and therefore reaches the controller 110B, but the ID ("5") included in the response is different from the ID ("10") for distinguishing the controller 110B. Therefore, the controller 110B determines that the response is not in reply to the device-identifying signal that the controller 110B transmitted, and disregards the response transmitted from the renderer 120A (S19). On the other hand, the response transmitted from the renderer 120A also reaches the renderer 120B, but the renderer 120B does not have the function of receiving the response to the device-identifying signal, and disregards the response (S21).

In the example of FIG. 2, when the controller 110B is also located in front of the renderer 120A, the controller 110B may transmit the device-identifying signal to the renderer 120A (S23). In this case, when the renderer 120A receives the device-identifying signal transmitted from the controller 110B, the renderer 120A transmits a response including the ID ("10"), which has been received together with the device-identifying signal, to the network 101 via multicast or broadcast (S25). At this moment, the device-identifying signal transmitted from the controller 110B does not reach the renderer 120B and therefore don't be received by the renderer 120B, because the renderer 120B is installed in a room different from the room in which the controller 110B is installed (S27). Therefore, the renderer 120B does not transmit a response in reply to the device-identifying signal transmitted from the controller 110B.

Next, when the response transmitted by the renderer 120A reaches the controller 110A via the network 101, the controller 110A compares the ID included in the response and the ID included in the device-identifying signal that the controller 110A transmitted. In this case, the ID ("10") included in the response from the renderer 120A is a value different from the ID ("5") included in the device-identifying signal that the controller 110A transmitted. Therefore, the controller 110A determines that the received response is in reply to an device-identifying signal transmitted by another device (the controller 110B), and disregards the response (S29). As described above, the controller 110A can determine, based on the ID included in the response, whether the response is in reply to the device-identifying signal transmitted by the controller 110A.

On the other hand, the ID ("10") included in the response transmitted from the renderer 120A is the same value as the ID ("10") for distinguishing the controller 110B. Therefore, the controller 110B determines that the response is in reply to the device-identifying signal transmitted by the controller 110B, and receives the response transmitted by the renderer 120A (S31). Further, the renderer 120B also receives the response transmitted from the renderer 120A, but the renderer 120B does not have the function of receiving the response to the device-identifying signal, and disregards the response in a similar manner to the above (S33).

In the present embodiment, the controller 110A previously sets a time within which the controller 110A is to receive the response to the device-identifying signal, and the controller 110A is configured to make a determination whether the IDs are the same only when the controller 110A receives the response within the set time. Therefore, after the set time passes and it times out (S35), the controller 110A disregards the response even if the controller 110A receives the response. In the example of FIG. 2, until it times out (S35), the controller 110A receives the response including the ID "5" transmitted by the renderer 120A and the response including the ID "10" transmitted by the renderer 120A. Of the two responses, the response including the ID "10" is different from the ID "5" included in the device-identifying signal transmitted by the controller 110A, and only the response including the ID "5" transmitted by the renderer 120A corresponds to the ID "5" of the controller 110A. In other words, the controller 110A receives only the response including the ID "5" transmitted by the renderer 120A until it times out (S35). Therefore, the controller 110A determines that the renderer 120A, having transmitted the response which the controller 110A has received until it timed out, has received the device-identifying signal transmitted by the controller 110A (i.e., the renderer 120A is in front of the controller 110A) (S37).

As described above, in the example of FIG. 2, the controller 110A, i.e., an example of the controlling device, identifies, based on the ID, the response to the device-identifying signal transmitted by the controller 110A from among the responses transmitted from a plurality of devices. However, it may be unnecessary to use IDs when there is only one controlling device capable of transmitting the device-identifying signal or when it is less likely that the device-identifying signals are transmitted from a plurality of controlling devices and it is less likely that a response is erroneously recognized (i.e., a response in reply to another device is received).

Alternatively, the IDs may not be included in the device-identifying signal, and the controlling device may select and transmit one of a plurality of types of device-identifying signals previously prepared, so that the controlled device receiving the device-identifying signal may transmit a response including signal type information indicating the type of the received device-identifying signal. This method will be later explained in detail.

As described above, in the present embodiment, the device-identifying signal may not necessarily include an ID when the controlling device transmits the device-identifying signal.

Figure 3:
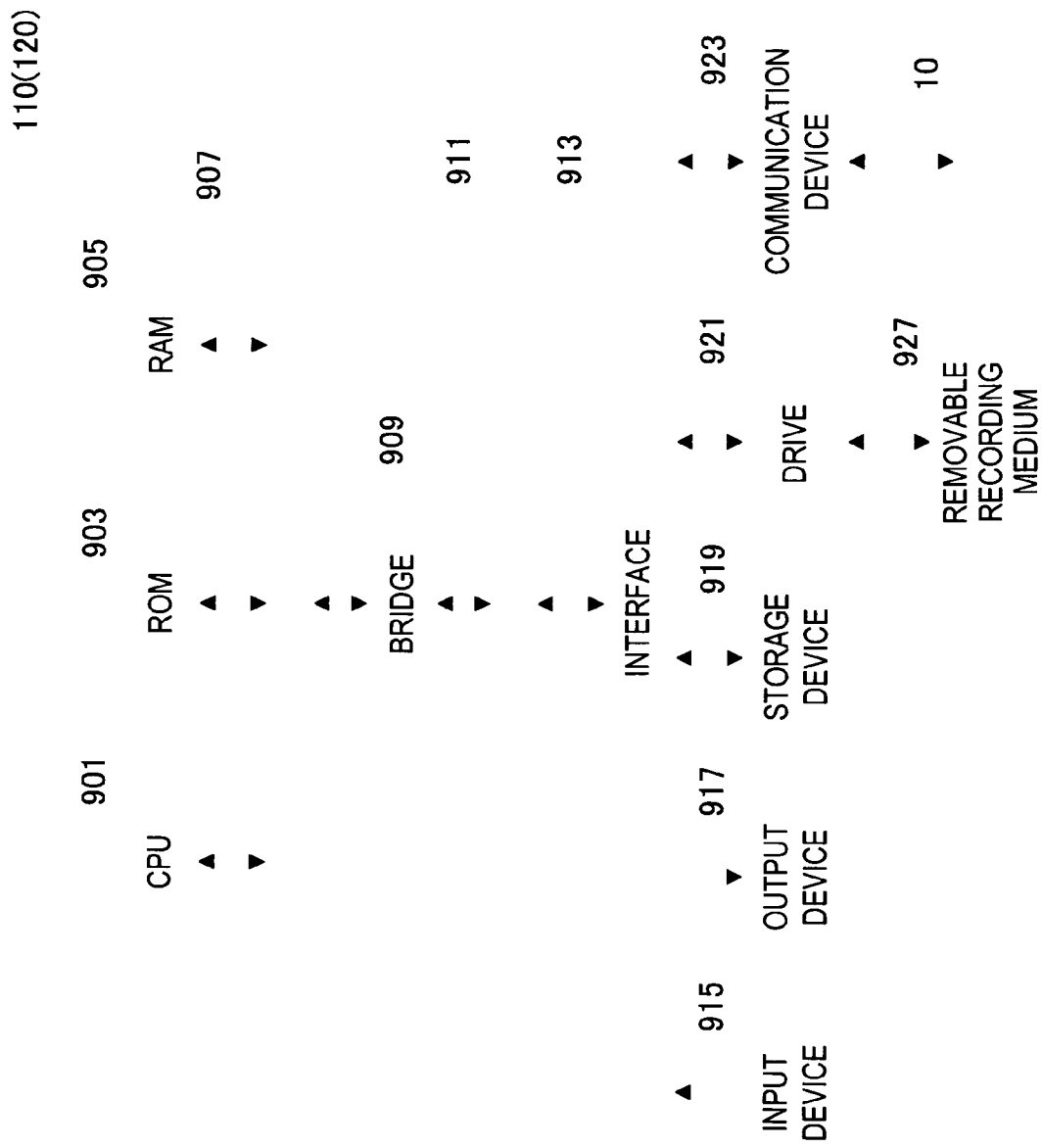
FIG. 3 is a block diagram showing hardware configuration of a controller or a renderer according to the embodiment.

Exemplary Hardware Configuration of Controlling Device and Controlled Device According to the First Embodiment of the Present Invention Subsequently, hardware configuration of the controllers 110A and 110B and the renderers 120A and 120B will be described with reference to FIG. 3. In the below explanation, the controllers 110A and 110B may be collectively referred to as "the controllers 110", and the renderers 120A and 120B may be collectively referred to as "the renderers 120." It should be noted that the controllers 110A and 110B are examples of the controlling devices, and the renderers 120A and 120B are examples of the controlled devices. The controllers 110A and 110B and the renderers 120A and 120B constitute the device-identifying system 100 according to the present embodiment. FIG. 3 is a block diagram showing the hardware configuration of the controller 110 or the renderer 120 according to the present embodiment. The hardware configuration of the controller 110 and the hardware configuration of the renderer 120 are substantially the same. Therefore, in the below explanation, only the controller 110 will be explained as an example, and then, the features unique to the renderer 120 will be mentioned later.

As shown in FIG. 3, the controller 110 mainly includes a CPU (Central Processing Unit) 901, a ROM (Read Only Memory) 903, a RAM (Random Access Memory) 905, a host bus 907, a bridge 909, an external bus 911, an interface 913, an input device 915, and an output device 917, a storage device 919, a drive 921, a connection port 923, and a communication device 925.

The CPU 901 functions as an arithmetic processing unit and controlling device, and controls overall operation of the controller 110 or a portion of the operation of the controller 110 in accordance with various programs stored in the ROM 903, the RAM 905, the storage device 919, or a removable recording medium 927. The ROM 903 stores programs, operation parameters, and the like used by the CPU 901. The RAM 905 primarily stores the programs used during the execution of the CPU 901 and the parameters and like that changes, as appropriately, during the execution. These are connected with each other via the host bus 907 made with an internal bus such as a CPU bus.

The host bus 907 is connected to the external bus 911 such as PCI (Peripheral Component Interconnect/Interface) bus via the bridge 909.

The input device 915 is operation means such as a mouse, a keyboard, a touch panel, buttons, switches, and levers which are operated by a user. The input device 915 may be remote control means (i.e., a so-called remote controller) using infrared, other radio waves, and the like, or may be an externally connected device 929 such as a portable telephone, a PDA, and the like adapted to operate the controller 110. Further, for example, the input device 915 includes an input control circuit for generating an input signal based on information input by a user with the above operation means and outputting the input signal to the CPU 901. The user of the controller 110 can input various data to the controller 110 and instruct the controller 110 to perform operational processings by operating this input device 915.

The output device 917 includes a display device such as a CRT display device, a liquid crystal display device, a plasma display device, an EL display device, and lamps, and an audio output device such as a speaker and a headphone, which can notify obtained information to a user by visual or auditory means. The output device 917 of the controller 110 outputs an image signal relating to, for example, a list of controlled devices such as the renderer 120 that can be controlled by the controller 110 and a list of contents stored in the server 130. On the other hand, the output device 917 of the renderer 120 outputs an image signal relating to the contents distributed by the server 130. Specifically, the display device displays various kinds of information such as image data in a form of text or images. On the other hand, the audio output device converts audio data and the like into audio and outputs the audio.

The storage device 919 is a data storage device arranged as an example of a storage medium of the controller 110 according to the present embodiment. The storage device 919 is made with a magnetic storage device such as HDD (Hard Disk Drive), a semiconductor storage device, an optical storage device, a magneto-optical storage device, or the like. The storage device 919 stores programs executed by the CPU 901, various data, data obtained from the outside, and the like.

The drive 921 is a reader/writer for a storage medium. The drive 921 is embedded in the controller 110 and the renderer 120 or attached externally thereto. The drive 921 reads information recorded on the loaded removable recording medium 927 such as a magnetic disk, an optical disk, a magneto-optical disk, or a semiconductor memory, and outputs the information to the RAM 905. The drive 921 can also write recordings to the loaded removable recording medium 927 such as a magnetic disk, an optical disk, a magneto-optical disk, or a semiconductor memory. The removable recording medium 927 is, for example, a DVD medium, an HD-DVD medium, a Blu-ray medium, a compact flash (registered trademark) (CompactFlash: CF), a Memory Stick, a secure digital memory card (SD memory card), or the like. Alternatively, the removable recording medium 927 may be, for example, an integrated circuit card (IC card) or an electronic device including a noncontact IC chip.

The connection port 923 is, for example, a universal serial bus (USB) port, an IEEE1394 port such as i. Link, a small computer system interface (SCSI) port, an RS-232C port, and an optical audio terminal. The connection port 923 is a port for directly connecting the device to the controller 110 or the renderer 120.

The communication device 925 is, for example, a communication interface made with a communication device and the like for connecting to a communication network 10. The communication device 925 is, for example, a communication card for a wired or wireless Local Area Network (LAN), a Bluetooth, or a wireless USB (WUSB), a route for optical communication, a route for asymmetric digital subscriber line (ADSL), a model for various communications, or the like. For example, the communication device 925 can send data to and receive data from the Internet and other communication devices. The communication network 10 connected to the communication device 925 includes the network 101 connected via wire or connected wirelessly. The communication network 10 may be, for example, Internet, a home LAN, an infrared light communication, or a satellite communication.

The example of the hardware configuration that can realize the functions of the controlling device and the controlled device according to the present embodiment has been explained hereinabove. Each of the above constituent elements may be made with a general-purpose member, or may be made of hardware specialized for the function of each of the constituent elements. Therefore, the used hardware configuration can be changed as necessary in accordance with the level of technology when the embodiments are carried out.

Figure 4:
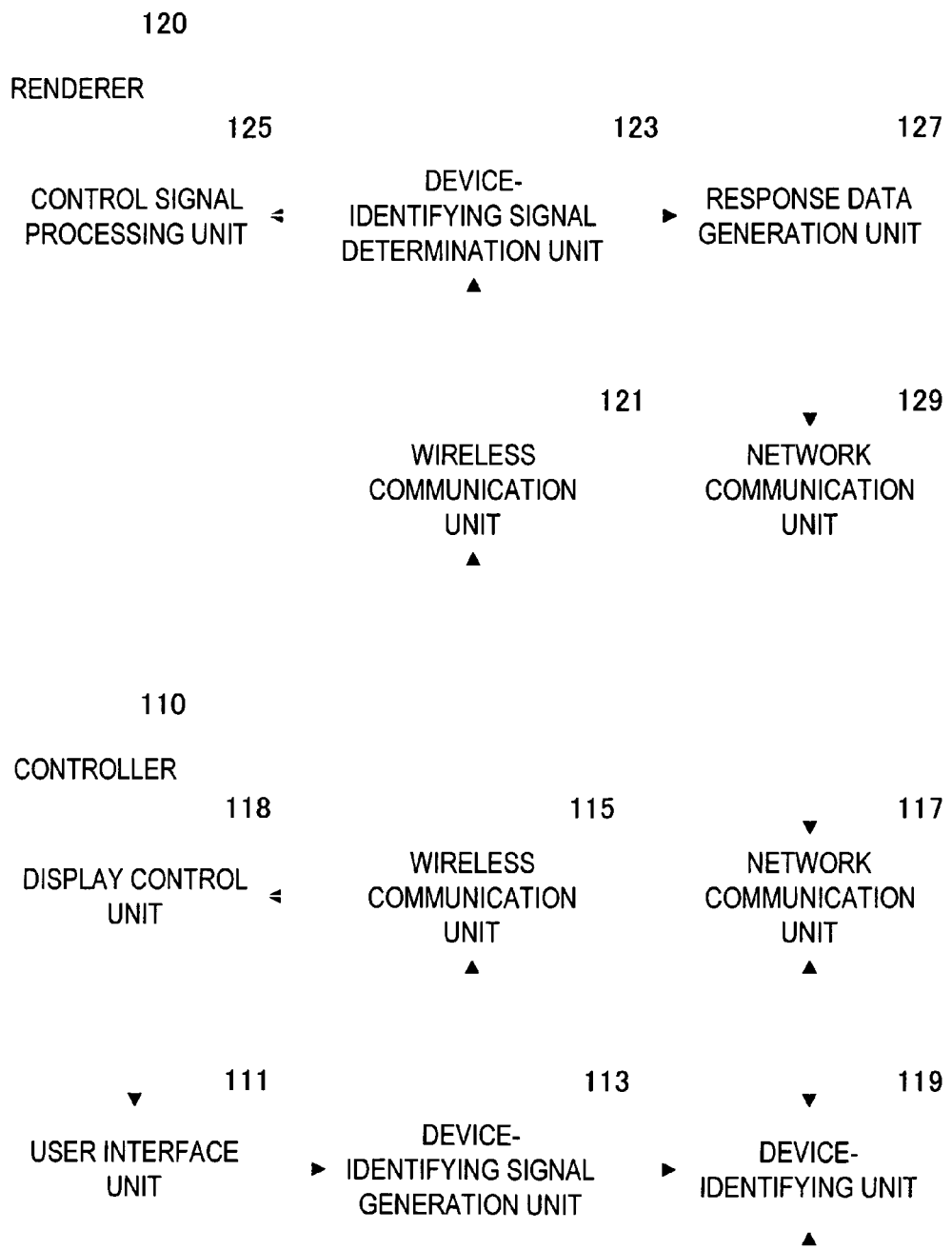
FIG. 4 is a block diagram showing functional configuration of the controller or the renderer according to the embodiment.

Subsequently, the functional configuration of the controlling device and the controlled device according to the present embodiment achieved by the above hardware configuration will be hereinafter described in detail with reference to FIG. 4. FIG. 4 is a block diagram showing the functional configuration of the controller 110 as an example of the controlling device according to the present embodiment and the renderer 120 as an example of the controlled device according to the present embodiment.

<Functional Configuration of the Controller 110>

The controller 110 can communicate with an external device via the network 101. The controller 110 is an example of the controlling device according to the present embodiment that can communicate with an external device by using a wireless communication method limited in at least one of the directivity and the transmittable communication range. Without relying on the network 101, the controller 110 transmits, to an device capable of communicating by the wireless communication method (the controlled device), the device-identifying signal for identifying the device. When the controller 110 receives a response from the controlled device in reply to the device-identifying signal transmitted by the controller 110, the controller 110 determines that the controlled device transmitted the response is an device that has received the device-identifying signal transmitted by the controller 110. Specifically, as shown in FIG. 4, the controller 110 mainly includes a user interface unit 111, an device-identifying signal generation unit 113, a wireless communication unit 115, a network communication unit 117, and an device-identifying unit 119.

In response to operation performed by a user on the input device 915, the user interface unit 111 instructs the controller 110 to perform a predetermined processing based on the input operation signal, and causes the output device 917 to output characters, images, audio, and the like based on predetermined data. Specifically, for example, the user interface unit 111 displays, on a display screen of the output device 917, a list of the controlled devices connected to the network 101 and a list of contents obtained from the server 130. Further, the user interface unit 111 notifies to the device-identifying signal generation unit 113 an device to be controlled which is selected by a user from the list of the controlled devices displayed on the display screen.

The device-identifying signal generation unit 113 generates the device-identifying signal, which is to be transmitted from the wireless communication unit 115, in order to identify one of the external devices connected to the network 101 that can communicate by the wireless communication method of the wireless communication unit 115 (for example, the controlled device such as the renderer 120 arranged in the same room as the room in which the controller 110 is arranged). The device-identifying signal is generated in a form of a combination of a category and a command. In this case, the category of the device-identifying signal is information indicating the device-identifying signal which is different from other signals (for example, a control signal for operating a television receiver). On the other hand, the command is a parameter of the device-identifying signal of the same category. For example, when the identifier described above is to be transmitted, and when the ID is "5", a command "5" is transmitted, so that the command functions as the identifier. It should be noted that the device-identifying signal is transmitted when, for example, a user uses the controller 110 to cause the renderer 120 to start playing the contents stored in the server 130.

As described above, the controller 110 may transmit the device-identifying signal including the identifier for distinguishing the controller 110 itself. In such a case, the device-identifying signal generation unit 113 generates the identifier to be included in the device-identifying signal. The identifier is not especially limited, but for example, an ID specifying one of numerals from 1 to 255 may be used as the identifier. The device-identifying signal generation unit 113 may determine the ID as a fixed value unique to each controller 110, or may determine the ID based on a random number and the like every time the device-identifying signal is transmitted.

Alternatively, as described above, the controller 110 may select and transmit one of a plurality of types of device-identifying signals. In such a case, the device-identifying signal generation unit 113 generates the plurality of types of device-identifying signals. It should be noted that the device-identifying signal generation unit 113 generates an device-identifying signal in a form of a combination of a category and a command, and may generate, for example, a plurality of signals which have the same command but have different categories.

Alternatively, as described above, the device-identifying signal may be generated in a format non-compatible with the control signal for controlling the renderer 120A. Accordingly, the controller 110A may select and transmit one of the device-identifying signals generated in a format non-compatible with the control signal. In such a case, the renderer 120A transmits a response including signal type information indicating one of the device-identifying signals. Further, the controller 110A may be configured to receive only the response including the signal type information representing the same type as that of the one of the device-identifying signals transmitted by the controller 110A.

The wireless communication unit 115 uses the wireless communication method limited in at least one of the directivity and the transmittable communication range to communicate with at least some of the external devices connected to the network without relying on the network 101. In the wireless communication method limited in the directivity, the propagation direction of the device-identifying signal and the control signal transmitted from the wireless communication unit 115 is limited to a predetermined direction, and the signals do not reach devices located in directions different from the direction to which the controller 110 is directed. In the wireless communication method limited in the transmittable range, the reachable range of the device-identifying signal and the control signal is limited to a predetermined range, and for example, the signal does not reach devices located in a room different from the room in which the controller 110 is arranged. For example, the wireless communication method limited in at least one of the directivity and the transmittable communication range includes an optical signal including infrared light, an audio signal, and the like. The wireless communication unit 115 according to the present embodiment transmits, to the controlled device such as the renderer 120, the device-identifying signal generated by the device-identifying signal generation unit 113 and a predetermined control signal (for example, a signal for instruction of reproducing and recording of contents) generated by a control signal generation unit, not shown. When an identifier such as an ID is used to identify a controlled device to be controlled, the wireless communication unit 115 transmits not only the device-identifying signal but also an identifier for distinguishing the controller 110 included in the device-identifying signal.

The network communication unit 117 communicates with an external device connected to the network 101 (for example, the controlled device such as the renderer 120 and the server 130) via the network 101. In particular, in the present embodiment, the network communication unit 117 receives a response in reply to the device-identifying signal transmitted, via multicast or broadcast, to the network 101 from the renderer 120 that has received the device-identifying signal transmitted from the wireless communication unit 115.

In addition, when the wireless communication unit 115 transmits the ID together with the device-identifying signal, the network communication unit 117 receives not only the response to the device-identifying signal but also the ID transmitted from the renderer 120. The network communication unit 117 outputs the received ID to the device-identifying unit 119. When the wireless communication unit 115 transmits an device-identifying signal selected from a plurality of types of device-identifying signals, the network communication unit 117 receives not only the response to the device-identifying signal but also signal type information representing the type of the device-identifying signal. The network communication unit 117 outputs the received signal type information to the device-identifying unit 119. When the device-identifying unit 119 determines, based on the ID or the signal type information, that the response having reached the network communication unit 117 is in reply to the controller 110, the response is received.

Further, the controller 110 may set a predetermined waiting time for which the network communication unit 117 waits for the response after the wireless communication unit 115 transmits the device-identifying signal. In such a case, the network communication unit 117 keeps waiting for the response for the set waiting time. When no response is received from any of the devices until the set waiting time passes (time out), the network communication unit 117 notifies to the device-identifying unit 119 that no response has been received. When no response is received, the device-identifying unit 119 determines that there is no device capable of responding in proximity to the controller 110 (no device capable of receiving the device-identifying signal).

On the other hand, when a response from any one of the devices reaches the network communication unit 117 before it times out, and when the response does not include any ID, the network communication unit 117 receives the response. When a response from any one of the devices reaches the network communication unit 117 before it times out, and when the response includes an ID or signal type information, the network communication unit 117 outputs the received ID or the received signal type information to the device-identifying unit 119 as described above. Then, the device-identifying unit 119 determines whether the received ID or the received signal type information is the same as what has been transmitted from the controller 110. When the received ID or the received signal type information is determined to be the same as what has been transmitted from the controller 110, the network communication unit 117 receives the response. When the received ID or the received signal type information is determined not to be the same as what has been transmitted from the controller 110, the network communication unit 117 disregards the response, and waits for receiving another response until it times out.

It should be noted that the network communication unit 117 can obtain a list of the contents stored in the server 130 from the server 130, and can obtain a list of devices connected to the network 101, via the network 101.

When the network communication unit 117 receives a response from the controlled device such as the renderer 120 that has received the device-identifying signal, the device-identifying unit 119 determines that the controlled device having transmitted the response is an device having received the device-identifying signal transmitted from the wireless communication unit 115.

Further, when the wireless communication unit 115 transmits not only the device-identifying signal but also the ID, the device-identifying unit 119 determines whether the ID input from the network communication unit 117 is the same as the ID transmitted by the wireless communication unit 115. When the ID input from the network communication unit 117 is determined to be the same as the ID transmitted by the wireless communication unit 115, the device-identifying unit 119 notifies this determination result to the network communication unit 117, and the network communication unit 117 receives the response from the renderer 120. On the other hand, when the ID input from the network communication unit 117 is determined to be different from the ID transmitted by the wireless communication unit 115, the network communication unit 117 does not receive the response transmitted from the renderer 120. When the wireless communication unit 115 transmits an device-identifying signal selected from a plurality of types of device-identifying signals, the device-identifying unit 119 determines whether a signal type specified by the signal type information input from the network communication unit 117 is the same as the type of the device-identifying signal transmitted by the wireless communication unit 115. When the signal type specified by the signal type information input from the network communication unit 117 is determined to be the same as the type of the device-identifying signal transmitted by the wireless communication unit 115, the device-identifying unit 119 notifies the determination result to the network communication unit 117, and the network communication unit 117 receives the response from the renderer 120. When the signal type specified by the signal type information input from the network communication unit 117 is determined to be different from the type of the device-identifying signal transmitted by the wireless communication unit 115, the network communication unit 117 does not receive the renderer 120.

When a plurality of controlled devices such as the renderer 120 receive the device-identifying signal transmitted by the controller 110, the controller 110 may receive a plurality of responses until it times out. In such a case, the network communication unit 117 may be configured to receive all of the responses having reached the network communication unit 117 until it timed out.

As described above, when the network communication unit 117 receives a plurality of responses from the controlled devices such as the renderer 120, the network communication unit 117 outputs to a display control unit 118 information about the names and the IDs of the controlled devices having transmitted the responses. When the display control unit 118 receives the information about the names and the IDs of the plurality of controlled devices having transmitted the responses, the display control unit 118 causes a user interface unit 111 to display, on a user interface screen, a list of controlled devices from which the network communication unit 117 has received responses until it timed out.

Therefore, a user of the controller 110 can see the names and the like of the controlled devices from which the network communication unit 117 has received responses until it timed out, so that the user can select an device which is considered to be in front of the controller 110 from among the displayed list. The user interface unit 111 receives the information about the name and the ID of the device selected by the user, and the user interface unit 111 outputs the received information to the device-identifying unit 119. Then, the device-identifying unit 119 determines that the controlled device selected from the list of the controlled devices displayed on the user interface screen based on the information input with the user interface unit 111 is the device having received the device-identifying signal transmitted from the wireless communication unit 115.

As described above, the controller 110 may receive all of the responses having reached the network communication unit 117 until it timed out (it should be noted that some of the responses may be disregarded when responses include IDs and the like). Alternatively, the controller 110 may receive only the first response having reached the network communication unit 117 and may reject receiving the second and subsequent responses. In other words, when a plurality of responses reach the network communication unit 117, the network communication unit 117 of the controller 110 may be configured to receive only the first response. In such a case, the device-identifying unit 119 can determine that the controlled device having transmitted the response that has first reached the device-identifying unit 119 is the device that has received the device-identifying signal transmitted from the wireless communication unit 115.

When the network communication unit 117 receives the response from the renderer 120, the device-identifying unit 119 identifies an ID, an IP address, a MAC address, a UDN, and the like of the responded device based on information for identifying the sender of the response included in the response.

<Functional Configuration of the Renderer 120>

The renderer 120 is an example of the controlled device according to the present embodiment that can communicate via the network 101 with the controller 110 serving as an example of the controlling device according to the present embodiment. When the renderer 120 receives the device-identifying signal from the controller 110, the renderer 120 transmits to the network 101 via multicast or broadcast a response indicating that the renderer 120 has received the device-identifying signal. Specifically, as shown in FIG. 4, the renderer 120 mainly includes a wireless communication unit 121, an device-identifying signal determination unit 123, a control signal processing unit 125, a response data generation unit 127, and a network communication unit 129.

The wireless communication unit 121 uses the wireless communication method limited in at least one of the directivity and the transmittable communication range to communicate with the controlling device such as the controller 110. In the wireless communication method limited in the directivity, the propagation direction of the device-identifying signal and the control signal transmitted from the wireless communication unit 121 is limited to a predetermined direction, and the signals do not reach devices located in directions different from a predetermined direction. In the communication method limited in the transmittable range, the reachable range of the device-identifying signal and the control signal is limited to a predetermined range. For example, the signal transmitted from the controller 110 located in a room different from the room where the renderer 120 is installed does not reach. Such the wireless communication method limited in at least one of the directivity and the transmittable communication range includes an optical signal including infrared light, an audio signal, and the like. The wireless communication unit 121 according to the present embodiment receives, from the controlling device such as the controller 110, the device-identifying signal generated by the device-identifying signal generation unit 113 and the predetermined control signal (for example, a signal for instruction of reproducing and recording of contents) generated by the control signal generation unit, not shown. When an identifier such as an ID is used to identify a controlled device to be controlled, the wireless communication unit 121 receives not only the device-identifying signal but also an identifier for distinguishing the controller 110 included in the device-identifying signal.

When the wireless communication unit 121 receives a predetermined signal (for example, an infrared light signal) from the wireless communication unit 115 of the controller 110, the device-identifying signal determination unit 123 determines whether the received signal is the device-identifying signal or not. For example, this determination is made based on information about the category included in the signal received from the wireless communication unit 115. When the category belongs to a category of "television (for example, the renderer 110A)", the device-identifying signal determination unit 123 determines that the signal received from the wireless communication unit 115 is a normal control signal (for example, instructions for recording, reproducing, and the like, which are given by a remote controller). On the other hand, when the category indicates that the controller 110 has the function of the controlling device in the device-identifying system according to the present embodiment, the device-identifying signal determination unit 123 determines that the signal received from the wireless communication unit 115 is the device-identifying signal.

When the device-identifying signal determination unit 123 determines that the signal received from the wireless communication unit 115 is a normal control signal, the device-identifying signal determination unit 123 outputs the received control signal to the control signal processing unit 125. When the device-identifying signal determination unit 123 determines that the signal received from the wireless communication unit 115 is the device-identifying signal, the device-identifying signal determination unit 123 outputs the received device-identifying signal to the response data generation unit 127.

The control signal processing unit 125 performs a predetermined processing based on the control signal provided by the device-identifying signal determination unit 123. For example, when the category included in the control signal is "television", and the command is "reproducing content", the control signal processing unit 125 instructs a content reproducing unit, not shown, to perform the processing of reproducing the contents stored in the renderer 120 or the server 130.

When the wireless communication unit 121 receives the device-identifying signal from the controller 110, the response data generation unit 127 generates response data indicating that the device-identifying signal has been received. Specifically, the response data generation unit 127 generates the response data indicating that the renderer 120 has received the device-identifying signal input from the device-identifying signal determination unit 123, and outputs the response data to the network communication unit 129.

When the wireless communication unit 121 receives an ID together with the device-identifying signal from the wireless communication unit 115, the response data generation unit 127 identifies the received ID, and generates response data including an ID having the same value as the identified ID. Further, the response data generation unit 127 outputs the response data including the ID to the network communication unit 129.

When the wireless communication unit 121 receives from the wireless communication unit 115 an device-identifying signal selected from a plurality of types of device-identifying signals, the response data generation unit 127 first identifies the type of the received device-identifying signal, and generates signal type information indicating the type of the identified device-identifying signal. For example, a parameter of a command or the command itself included in the device-identifying signal received from the wireless communication unit 115 may be used as the signal type information. In other words, the response data generation unit 127 generates response data including the parameter of the command or the command itself included in the device-identifying signal received from the wireless communication unit 115, and outputs the generated response data to the network communication unit 129.

The network communication unit 129 transmits the response data generated by the response data generation unit 127 to the network 101 via multicast or broadcast. When the wireless communication unit 121 receives the ID together with the device-identifying signal from the wireless communication unit 115, the network communication unit 129 transmits, via multicast or broadcast, the response data including the ID generated by the response data generation unit 127. The wireless communication unit 121 receives an device-identifying signal selected from a plurality of types of device-identifying signals from the wireless communication unit 115, the network communication unit 129 transmits, via multicast or broadcast, the response data including the signal type information generated by the response data generation unit 127.

The network communication unit 129 transmits not only the response but also information to identify the sender of the response when the controller 110 receives the response. The information to identify the sender of the response includes at least a unique ID of the device transmitted the response (for example, the renderer 120), and may additionally includes an IP address, a MAC address, a UDN, and the like.

The network communication unit 129 can also obtain the contents stored in the server 130 from the server 130 via the network 101, and can obtain a list of devices connected to the network 101.

Flow of Processings of Device-Identifying Method According to The First Embodiment of the Present Invention The configuration of the device-identifying system 100 according to the present embodiment has been hereinabove explained in detail. Subsequently, the flow of processings of the device-identifying method performed in the device-identifying system 100 having such configuration will be explained in detail.

The device-identifying method according to the present embodiment includes step (1) of causing the controller 110 to transmit the device-identifying signal to the renderer 120, step (2) of causing the renderer 120 to transmit a response to the controller 110, and step (3) of causing the controller 110 to identify an device located in front of the controller 110.

In step (1), the controlling device (the controller 110) capable of communicating with a plurality of external devices via the network 101 transmits the device-identifying signal to the device (the renderer 120) capable of communicating by the wireless communication method limited in at least one of the directivity and the transmittable communication range.

Next, in step (2), when the controlled device (the renderer 120) receives the device-identifying signal from the controlling device (the controller 110), the controlled device (the renderer 120) transmits to the network 101 via multicast or broadcast a response indicating that the controlled device (the renderer 120) has received the device-identifying signal. Further, in step (3), when the controlling device (the controller 110) receives the response, the controlling device (the controller 110) determines that the controlled device (the renderer 120) having transmitted the response is an device capable of communicating by the wireless communication method (i.e., an device, which is to be controlled, located in front of the controlling device (the controller 110)). These steps will be hereinafter explained further in detail.

Figure 5:
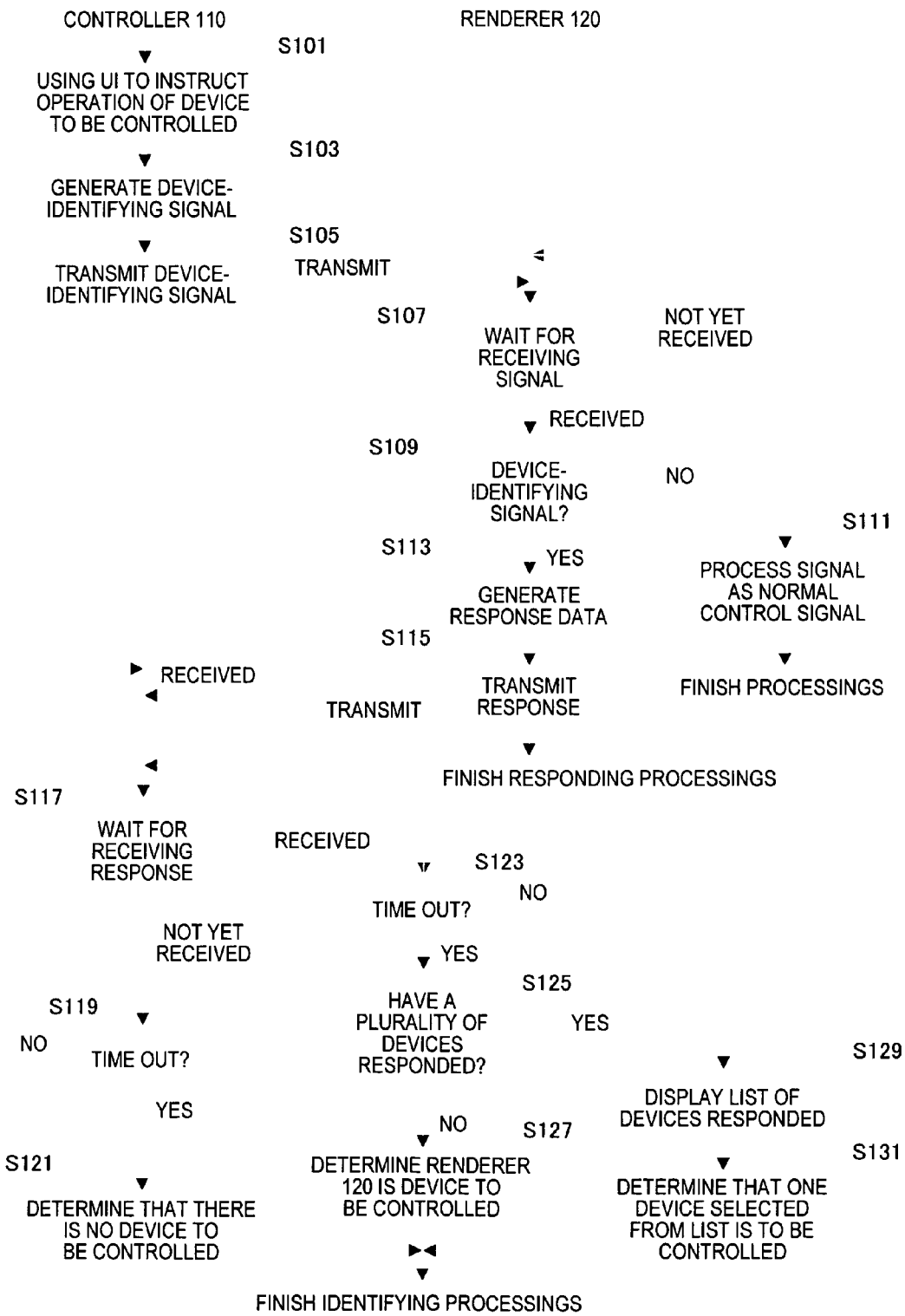
FIG. 5 is a flowchart showing a first example of processing of an device-identifying method according to the embodiment.

First, a first example of the processings of the device-identifying method according to the present embodiment will be explained with reference to FIG. 5. FIG. 5 is a flowchart showing the first example of the processings of the device-identifying method according to the present embodiment.

In the first example, any ID is not used when the device-identifying signal is transmitted. In this first example, as shown in FIG. 5, the user interface unit 111 of the controller 110 first selects to control an device to be controlled (in this example, the renderer 120), and instructs operation of the device to be controlled (S101). The device-identifying signal generation unit 113 generates the device-identifying signal based on the instruction given by the user interface unit 111 (S103), and outputs the generated device-identifying signal to the wireless communication unit 115. The wireless communication unit 115 receives the device-identifying signal, and the wireless communication unit 115 transmits the device-identifying signal to the device to be controlled, i.e., the renderer 120 (S105).

On the other hand, the renderer 120 waits for receiving signals such as the device-identifying signal and the control signal (in this example, infrared light signals are assumed to be used) (S107). When the wireless communication unit 121 of the renderer 120 receives an infrared light signal, the infrared light signal is output to the device-identifying signal determination unit 123. The device-identifying signal determination unit 123 determines whether the input infrared light signal is the device-identifying signal or not (S109). When the input infrared light signal is determined not to be the device-identifying signal, the infrared light signal is output to the control signal processing unit 125. The control signal processing unit 125 processes the infrared light signal as a normal control signal, and then terminates the processings (S111).

When the received infrared light signal is determined to be the device-identifying signal in the determination in step S109, the device-identifying signal determination unit 123 outputs the device-identifying signal to the response data generation unit 127. The response data generation unit 127 generates response data in reply to the received device-identifying signal (S113), outputs the generated response data to the network communication unit 129. The network communication unit 129 transmits the response data provided by the response data generation unit 127 to the network 101 via multicast or broadcast (S115), and then the renderer 120 terminates responding process. At this occasion, the response data generation unit 127 generates not only the generated response data but also information to identify the sender of the response when the controller 110 receives the response. The information to identify the sender of the response includes at least an ID unique to the device transmitted the response (for example, the renderer 120), and may additionally includes an IP address, a MAC address, a UDN, and the like.

After the controller 110 transmits the device-identifying signal in step S105, the network communication unit 117 waits for receiving a response (S117). As a result, when the network communication unit 117 does not receive any response until it times out, it is determined that there is no response, namely, it is determined that there is no device capable of responding in front of the controller 110 (i.e., there is no device capable of receiving the device-identifying signal). Therefore, it is determined that any device to be controlled is not present in front of the controller 110 (S119, S121).

On the other hand, when the network communication unit 117 receives a response until it times out, the network communication unit 117 further waits for receiving other responses until it times out (S123, S117). After it times out, the network communication unit 117 determines whether there are a plurality of devices having transmitted responses (S125). When it is determined as a result of the determination that there is only one device having transmitted a response, the network communication unit 117 notifies the device-identifying unit 119 to that effect. Accordingly, the device-identifying unit 119 determines that the renderer 120 having transmitted the response is the device to be controlled (S127). On the other hand, when it is determined as a result of the determination in step S125 that there are a plurality of devices having transmitted responses, the network communication unit 117 notifies the display control unit 118 to that effect. Accordingly, the display control unit 118 displays a list of devices having transmitted responses on a user interface screen (S129). Next, the user interface unit 111 notifies an device selected from this list to the device-identifying unit 119. Then, the device-identifying unit 119 determines that the device selected from the list is the device to be controlled (S131). Thereafter, the device-identifying processing is terminated.

In the example of FIG. 5, when responses are sent from a plurality of devices, the controller 110 is configured to wait for all of the responses sent from the devices until it times out. Alternatively, the controller 110 may not wait for the timeout, and may determine that the device from which the first response is received is the device to be controlled.

Figure 6:
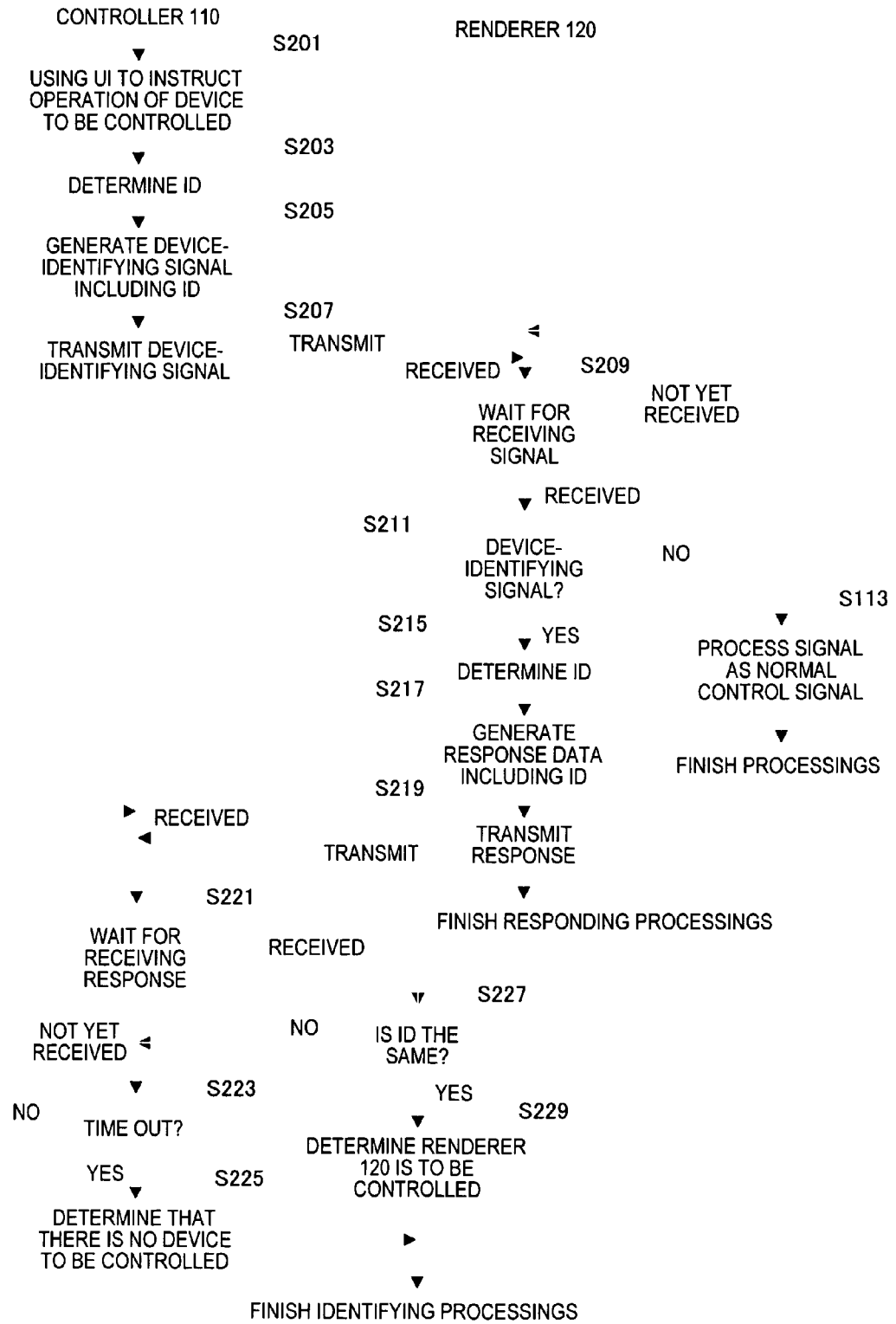
FIG. 6 is a flowchart showing a second example of processing of an device-identifying method according to the embodiment.

Next, the second example of the processings of the device-identifying method according to the present embodiment will be explained with reference to FIG. 6. FIG. 6 is a flowchart showing the second example of the processings of the device-identifying method according to the present embodiment.

In the second example, an ID is used when the device-identifying signal is transmitted. In this second example, as shown in FIG. 6, the user interface unit 111 of the controller 110 first selects controlling of an device to be controlled (in this example, the renderer 120), and instructs operation of the device to be controlled (S201). The device-identifying signal generation unit 113 determines an ID used in the device-identifying signal based on the instruction given by the user interface unit 111 (S203). It should be noted that the ID may be a value set uniquely for each controller by a user in advance, or may be a value set uniquely for each device by a manufacture. Alternatively, the ID may be a value set based on a random number when the controller 110 starts up or every time the device-identifying signal is generated. Further, the device-identifying signal generation unit 113 generates the device-identifying signal based on the determined ID (S205), and outputs the device-identifying signal including the generated ID to the wireless communication unit 115. The wireless communication unit 115 receives the device-identifying signal, and the wireless communication unit 115 transmits the device-identifying signal including the ID to the device to be controlled, i.e., the renderer 120 (S207).

On the other hand, the renderer 120 waits for receiving signals such as the device-identifying signal and the control signal (in this example, infrared light signals are assumed to be used) (S209). When the wireless communication unit 121 of the renderer 120 receives an infrared light signal, the infrared light signal is output to the device-identifying signal determination unit 123. The device-identifying signal determination unit 123 determines whether the input infrared light signal is the device-identifying signal or not (S211). When the input infrared light signal is determined not to be the device-identifying signal, the infrared light signal is output to the control signal processing unit 125. The control signal processing unit 125 processes the infrared light signal as a normal control signal, and then terminates the processings (S213).

When the received infrared light signal is determined to be the device-identifying signal in the determination in step S211, the device-identifying signal determination unit 123 outputs the device-identifying signal and the ID included therein to the response data generation unit 127. The response data generation unit 127 identifies the received ID (S215). Then, the response data generation unit 127 generates response data, including the same ID as the identified ID, in reply to the device-identifying signal (S217), and outputs the generated response data to the network communication unit 129. The network communication unit 129 transmits the response data provided by the response data generation unit 127 to the network 101 via multicast or broadcast (S219), and then the renderer 120 terminates responding process. At this occasion, the response data generation unit 127 generates not only the generated response data but also information to identify the sender of the response when the controller 110 receives the response. The information to identify the sender of the response includes at least a unique ID of the device transmitted the response (the renderer 120), and may additionally includes an IP address, a MAC address, a UDN, and the like.

After the controller 110 transmits the device-identifying signal in step S207, the network communication unit 117 waits for receiving a response (S221). As a result, when the network communication unit 117 does not receive any response until it times out, it is determined that there is no response, namely, it is determined that there is no device capable of responding in front of the controller 110 (i.e., there is no device capable of receiving the device-identifying signal). Therefore, it is determined that any device to be controlled is not present in front of the controller 110 (S223, S225).

On the other hand, when the network communication unit 117 receives a response until it times out, the network communication unit 117 outputs the ID included in the received response to the device-identifying unit 119. The device-identifying unit 119 determines whether the ID provided by the network communication unit 117 (the received ID) is the same as the ID transmitted from the wireless communication unit 115 (S227). When it is determined as a result of this determination that the ID provided by the network communication unit 117 (the received ID) is not the same as the ID transmitted from the wireless communication unit 115, the network communication unit 117 disregards the received response, further waits for responses until it times out (S223, S221). On the other hand, when it is determined as a result of the determination in step S227 that the ID provided by the network communication unit 117 (the received ID) is the same as the ID transmitted from the wireless communication unit 115, the device-identifying unit 119 determines that the received response is in reply to the device-identifying signal transmitted from the controller 110. Next, the device-identifying unit 119 identifies the device having transmitted the response based on the ID (in some cases, an IP address, a MAC address, a UDN, and the like) of the device having transmitted the response included in the received response. Further, the device-identifying unit 119 determines that the identified device having transmitted the response (in this example, the renderer 120) is the device to be controlled (S229). Thereafter, the device-identifying processing is terminated.

In the example of FIG. 6, the ID included in the device-identifying signal is used by the controller 110 to determine whether or not the received response is in reply to the device-identifying signal transmitted by the controller 110 itself. Alternatively, the controller 110 may select one of a plurality of device-identifying signals and transmit the selected device-identifying signal to the renderer 120, and the controller 110 may determine, based on the signal type information included in the response transmitted from the renderer 120, whether the received response is in reply to the device-identifying signal transmitted by the controller 110 itself. As described above, the signal type information may be, for example, a parameter of a command and the command itself constituting the device-identifying signal. Further, in a similar manner to the example of FIG. 5, the controller 110 may wait for receiving responses until it times out, and the controller 110 may identify the device to be controlled by selecting one of all of the devices having responded until then.

According to the device-identifying system 100 and the device-identifying method of the present embodiment as described above, the device-identifying signal can be transmitted using communication means limited in at least one of the directivity and the transmittable communication range, and the response in reply thereto is received via the network. With such configuration, it is possible to identify an device located within a range in which the device-identifying signal can be received from among devices capable of communicating on the network.

In other words, in the device-identifying system 100 and the device-identifying method of the present embodiment as described above, the device-identifying signal is transmitted via multicast or broadcast to all of the devices in the network 101 which the controlled devices (for example, the renderer 120) transmitting responses belong to. Therefore, it is not necessary for the controlling device to specify an address to which a response is to be transmitted, thus achieving faster processing. In addition, it is not necessary for the controlling device (for example, the controller 110) to transmit address information of the controlling device, which is used as a response in reply to the device-identifying signal, and therefore, the controlling device can reduce the amount of data to transmit the device-identifying signal. Therefore, according to the device-identifying system 100 and the device-identifying method of the present embodiment, the device-identifying signal can be transmitted by a communication method of a slow communication speed or a communication method limited in the amount of data that can be transmitted.

It should be understood by those skilled in the art that various modifications, combinations, sub-combinations and alterations may occur depending on design requirements and other factors insofar as they are within the scope of the appended claims or the equivalents thereof.

For example, the device-identifying system in the above-described embodiment supports DLNA and includes the DMC (the controller 110) as an example of the controlling device, the DMR (the renderer 120) as an example of the controlled device, and the DMS (the server 130). However, the device-identifying system according to the present invention is not necessarily a system supporting DLNA, as long as the device-identifying system is configured such that some of client devices connected to a predetermined network can control operation of other client devices.

What is claimed is:

1. A device-identifying system, comprising:
a controlling device capable of communicating with external devices via a network, the controlling device using a different wireless communication method limited in at least one of a directivity and a transmittable communication range to transmit an device-identifying signal, for identifying one of the external devices capable of communicating by the wireless communication method, to the one of the external devices without relying on the network; and
a controlled device capable of communicating with the controlling device both via the network and via the different wireless communication method, and when the controlled device receives the device-identifying signal from the controlling device via the wireless communication method, the controlled device transmitting, not via the wireless communication method but instead via the network by multicast or broadcast, a response indicating that the controlled device has received the device-identifying signal,
wherein in response to the controlling device receiving the response from the controlled device via the network within a predetermined period of time after transmitting the device-identifying signal, the controlling device determines that the controlled device having transmitted the response via the network has received the device-identifying signal transmitted via the wireless communication method from the controlling device, and
in response to the controlling device receiving the response from the controlled device after the predetermined period of time, the controlling device does not determine that the controlled device having transmitted the response has received the device-identifying signal from the controlling device and instead disregards the response.

2. The device-identifying system according to claim 1, wherein the controlling device transmits the device-identifying signal including an identifier for distinguishing the controlling device, the controlled device transmits the response including the identifier received from the controlling device, and the controlling device receives only the response including the same identifier as the identifier transmitted from the controlling device.

3. The device-identifying system according to claim 1, wherein the controlling device selects and transmits one of a plurality of types of device-identifying signals, the controlled device transmits the response including signal type information indicating the type of the one of the device-identifying signals, and the controlling device receives only the response including the signal type information indicating the same type as the type of the one of the device-identifying signals transmitted from the controlling device.

4. The device-identifying system according to claim 1, wherein the device-identifying signal is made in a format compatible with a control signal for controlling the controlled device, the controlling device selects and transmits one of the device-identifying signals made in the format compatible with the control signal, the controlled device transmits the response including signal type information indicating the one of the device-identifying signals, and the controlling device receives only the response including the signal type information indicating the same type as the one of the device-identifying signals transmitted from the controlling device.

5. The device-identifying system according to claim 1, wherein when a plurality of controlled devices receive the device-identifying signal, the controlling device receives responses from all of the controlled devices that transmit the responses within the predetermined period of time after transmitting the device-identifying signal.

6. The device-identifying system according to claim 5, wherein when the controlling device receive the responses from the plurality of controlled devices, the controlling device displays, on a user interface screen, a list of the controlled devices that transmitted the responses.

7. The device-identifying system according to claim 6, wherein the controlling device determines that one of the controlled devices selected from the list of the controlled devices has received the device-identifying signal transmitted from the controlling device.

8. The device-identifying system according to claim 1, wherein when the controlling device receive the responses from the plurality of controlled devices, the controlling device determines that one of the plurality of controlled devices having transmitted the response received first has received the device-identifying signal transmitted from the controlling device.

9. The device-identifying system according to claim 1, wherein the wireless communication method is a communication method using an optical signal including infrared light.

10. The device-identifying system according to claim 1, wherein when a plurality of controlled devices receive the device-identifying signal, the controlling device receives responses only from those of the plurality of controlled devices that transmit the responses within the predetermined period of time after the controlling device transmits the device-identifying signal, and disregards responses from any of the plurality of controlled devices that transmit the responses after the predetermined period of time.

11. A device-identifying method, comprising:
causing a controlling device capable of communicating with external devices via a network to use a different wireless communication method limited in at least one of a directivity and a transmittable communication range to transmit a predetermined device-identifying signal via the wireless communication network but not via the network to one of the external devices;
causing a controlled device capable of communicating with the controlling device both via the network and the wireless communication method to transmit, to the controlling device not via the wireless communication method but instead via the network by multicast or broadcast, a response indicating that the controlled device has received the device-identifying signal, when the controlled device receives the device-identifying signal via the wireless communication method from the controlling device;
in response to the controlling device receiving the response from the controlled device via the network within a predetermined period of time after transmitting the device-identifying signal,
causing the controlling device to determine that the controlled device having transmitted the response via the network but not via the wireless communication method is an external device capable of communicating by the wireless communication method with the controlling device; and in response to the controlling device receiving the response via the network after the predetermined period of time, causing the controlling device to not determine that the controlled device having transmitted the response has received the device-identifying signal from the controlling device and instead disregard the response.

12. A controlling device, comprising:
a network communication unit for communicating with external devices via a network;
a wireless communication unit that uses a different wireless communication method limited in at least one of a directivity and a transmittable communication range to communicate with at least some of the external devices;
a device-identifying signal generation unit for generating an device-identifying signal which is to be transmitted from the wireless communication unit using the different wireless communication method and not the network to identify one of the external devices capable of communicating by the wireless communication method; and
a device-identifying unit,
wherein in response to the network communication unit receiving a response not via the different wireless communication method but instead via the network from the external device that received the device-identifying signal via the wireless communication method within a predetermined period of time after the device-identifying signal generation unit transmits the device-identifying signal, the device-identifying unit determining that the external device having transmitted the response via the network has received the device-identifying signal transmitted from the wireless communication unit via the different wireless communication method, and
in response to the network communication unit receiving the response from the controlled device after the predetermined period of time, the device-identifying unit not determining that the controlled device having transmitted the response has received the device-identifying signal from the controlling device and instead disregarding the response.

13. A device-identifying system, comprising:
a controlling device, including:
a network communication unit for communicating with external devices via a network,
a wireless communication unit that uses a different wireless communication method limited in at least one of a directivity and a transmittable communication range to communicate with at least some of the external devices;
a device-identifying signal generation unit for generating an device-identifying signal which is to be transmitted from the wireless communication unit using the different wireless communication method and not the network to identify one of the external devices capable of communicating by the wireless communication method, and
a device-identifying unit; and
a controlled device, including:
a wireless communication unit that uses the first wireless communication method limited in at least one of a directivity and a transmittable communication range to communicate with the controlling device;
a response data generation unit that, when the wireless communication unit receives the device-identifying signal from the controlling device by the first wireless communication method, generates the response data indicating that the device-identifying signal has been received by the controlled device; and
a network communication unit for transmitting the response data not via the first wireless communication method over which the device-identifying signal was received, but instead via the network by multicast or broadcast,
wherein in response to the network communication unit receiving a response not via the different wireless communication method but instead via the network from the external device that received the device-identifying signal via the wireless communication method within a predetermined period of time after the device-identifying signal generation unit transmits the device-identifying signal, the device-identifying unit determining that the external device having transmitted the response via the network has received the device-identifying signal transmitted from the wireless communication unit via the different wireless communication method, and
in response to the network communication unit receiving the response from the controlled device after the predetermined period of time, the device-identifying unit not determining that the controlled device having transmitted the response has received the device-identifying signal from the controlling device and instead disregarding the response.

* * * * *